United States Patent [19]

Kumpf et al.

[11] Patent Number: 5,064,929
[45] Date of Patent: Nov. 12, 1991

[54] AROMATIC POLYETHERS CONTAINING AZO GROUPS

[75] Inventors: Robert J. Kumpf; Dittmar K. Nerger, both of Pittsburgh, Pa.

[73] Assignee: Mobay Corporation, Pittsburgh, Pa.

[21] Appl. No.: 531,188

[22] Filed: May 31, 1990

[51] Int. Cl.$^5$ .................. C08G 75/00; C08G 8/02; C08G 14/00
[52] U.S. Cl. .................................. 528/172; 528/125
[58] Field of Search ........................ 528/172, 125

[56] References Cited

U.S. PATENT DOCUMENTS

| | | | |
|---|---|---|---|
| 3,264,536 | 8/1966 | Robinson et al. | 528/174 |
| 4,105,636 | 8/1978 | Taylor | 528/126 |
| 4,108,837 | 8/1978 | Johnson et al. | 528/126 |
| 4,175,175 | 11/1979 | Johnson et al. | 528/125 |
| 4,786,694 | 11/1988 | Clendinning et al. | 525/471 |

OTHER PUBLICATIONS

Hall et al, Macromolecules, 1987, vol. 20, pp. 2041–2044.
Riordan et al, "Polymer", 1979, vol. 20, p. 196.
Bualek et al. Makromol. Chem., 1988, vol. 189, pp. 797–804.

Primary Examiner—John Kight, III
Assistant Examiner—T. Mosley
Attorney, Agent, or Firm—Joseph C. Gil; Lyndanne M. Whalen

[57] ABSTRACT

A dihalobenzenoid compound is reacted with a dihydric phenol containing an azo group in the presence of a base, an organic solvent and an azeotrope former. Dihydric phenols which do not contain azo groups may also be included in the reaction mixture. This reaction is generally carried out at a temperature of from about 20° to about 250° C. under an inert atmosphere. The polyether obtained is represented by the formula

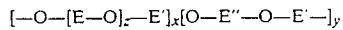

in which E, E', E'', x, y and z have the meaning specified herein.

16 Claims, No Drawings

// 1

AROMATIC POLYETHERS CONTAINING AZO GROUPS

BACKGROUND OF THE INVENTION

The present invention relates to a process for the synthesis of aromatic ether polymers which contain azo groups along the polymer backbone and to the polymers produced by this process.

Aromatic polyethers are a general class of engineering polymers which contain aromatic rings linked by oxygen atoms exclusively, or oxygen atoms in combination with other groups such as sulfur, sulfone, ketone, alkylene, or imide. More specifically, aromatic polyether sulfones contain both ether and sulfone linkages. Commercially available polyether sulfones are amorphous materials which have very high glass transition temperatures (typically well over 200° C.). Similarly, aromatic polyether ketones consist of aromatic rings linked by ether and ketone groups. Aromatic polyether ketones are high melting, semi-crystalline polymers which exhibit excellent environmental stability, and are commercially available. Typical aromatic polyethers known in the art are described in U.S. Pat. Nos. 4,105,636 and 4,786,694.

Recently, there has been interest in incorporating chromophoric groups into polymer backbones. Polyamides and polyesters containing azo chromophones have been synthesized. See, e.g., Hall et al, *Macromolecules*. 1987, volume 20, pages 2041–2044; and Bualek et al, *Makromol. Chem.* 1988, volume 189, pages 797–804. A number of potential applications have stimulated interest in azo-containing polymers. Since the azo linkage perpetuates the persistence direction of the backbone, azo residues have been used as mesogens in liquid crystalline polymers (note the Hall et al reference noted above). In addition, azo units absorb visible light, so that azo-containing polymers have been investigated as possible high grade pigments. See, e.g., Riordan et al, *POLYMER*. 1979, 20 196. In addition, diphenylazo groups undergo a reversible trans-cis isomerism. Thus, azo-containing polymers are potential photo-responsive materials.

U.S. Pat. Nos. 4,108,837 and 4,175,175 describe a variety of aromatic polyethers prepared by reacting dihalobenzenoids with dihydric phenols (or the double alkali metal salts thereof). Among the dihalobenzenoids described are those containing an azo group (note Examples 31, 32 and 33 of both patents).

SUMMARY OF THE INVENTION

It is an object of the present invention to provide substantially linear thermoplastic aromatic polyethers which contain azo groups in the backbone.

It is another object of the present invention to provide a process for making substantially linear thermoplastic aromatic polyethers which contain azo groups in the backbone.

These and other objects which will be apparent to those skilled in the art are accomplished by reacting a dihalobenzenoid compound with a dihydric phenol containing an azo group in the presence of a base, an organic solvent and an azeotrope former. Dihydric phenols which do not contain azo groups may also be included in the reaction mixture. This reaction is generally carried out at a temperature of from about 20° to about 250° C. under an inert atmosphere. The polyether obtained is represented by the formula

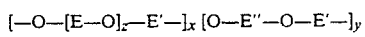

in which E, E', E", x, y and z have the meanings specified herein.

DESCRIPTION OF THE INVENTION

The present invention is directed to a substantially linear thermoplastic aromatic polyether composed of recurring units of the general formula:

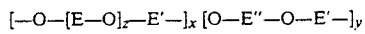

in which
E' represents the residuum of a benzenoid compound having an electron withdrawing group in at least one of the positions ortho or para to the valence bonds, and having a sigma* value sufficient to activate halogens in the said valence positions to a level adequate to react with an alkali metal phenolate,
E represents the residuum of an azo-group containing bisphenol,
E" represents the residuum of a dihydric phenol which does not contain azo groups,
in which each of the residua represented by E, E' and E" is valently bonded to ether oxygens through aromatic carbon atoms, and
z represents an integer of from 1 to 3, preferably 1 or 2, and
x and y each represents a mol%, the total of x plus y is 100 and x is always greater than zero, preferably greater than 1 and most preferably greater than 10.

The terminal groups bonded to these recurring units may be any suitable group known to those in the art. The terminal groups do not have any significant effect upon the product properties and will not therefore be further discussed.

The polymers of the present invention exhibit excellent strength and toughness properties as well as outstanding thermal, oxidative and chemical stability. The polymers of the present invention form tough, transparent films which are suitable for optical applications such as filters, photoresponsive films.

The polymers of the present invention may be prepared by the techniques described in U.S. Pat. Nos. 4,108,837 and 4,175,175, the disclosures of which are herein incorporated by reference. More particularly, the polymers of the present invention may be prepared by reacting a dihalobenzenoid compound with an azo-group containing dihydric phenol and optionally a dihydric phenol which contains no azo groups. This polymerization reaction is carried out at temperatures of from 20° to 250° C. under an inert atmosphere, in the presence of 1) a base capable of producing an alkali metal double salt (if the alkali metal salt of a dihydric phenol is not included as a reactant), 2) an organic solvent, and 3) an azeotrope former. The azeotrope former is included to remove water from the reaction mixture. This material could theoretically be omitted if another technique for removing water formed during the reaction were employed.

Substantially any dihalobenzenoid compound or mixture of dihalobenzenoid compounds can be used in the practice of the present invention provided the dihalobenzenoid compound(s) has the two halogens bonded to benzene rings having an electron withdrawing group in at least one of the positions ortho or para to the halogen group. The dihalobenzenoid compound can be either mononuclear with the halogens attached to the same benzenoid ring or polynuclear with each halogen attached to a different benzenoid ring as long as there is an activating electron withdrawing group in the ortho or para position of each halogen-containing benzenoid nucleus.

Any one of the elements in the family of halogens may be one or both of the reactive halogen substituents on the benzenoid compound. Fluorine and chlorine substituted benzenoid reactants are preferred. The fluorine compounds are advantageous because of their fast reactivity. The chlorine compounds are preferred because they are relatively inexpensive. Fluorine substituted benzenoid compounds are most preferred, particularly when there is a trace amount of water (i.e., below about 1% by weight) present in the polymerization reaction system.

Any electron withdrawing group can be employed as the activator group in these compounds. It should be, of course, inert under the polymerization conditions but otherwise its composition is not critical. Strong activating groups such as the sulfone group

bonding two halogen substituted benzenoid nuclei (as in 4,4'-dichlorodiphenyl sulfone and 4,4'-difluorodiphenyl sulfone) are preferred. However, the other strong withdrawing groups hereinafter mentioned may also be used.

The more powerful electron withdrawing groups give the fastest reactions and are therefore preferred. It is also preferred that no electron supplying groups be present on the same benzenoid nucleus on which the halogen is located. The presence of other groups on the nucleus or in the residuum of the compound can be tolerated but is not generally recommended. Preferably, all of the substituents on the benzenoid nucleus are either hydrogen (zero electron withdrawing) or other groups having a positive sigma* value. Sigma* values for specific electron withdrawing groups are given in J. F. Bunnett in Chem. Rev. 49273 (1951) and Quart. Rev., 12, 1 (1958). See also Taft, Steric Effects in Organic Chemistry, John Wiley & Sons (1956), chapter 13, Chem. Rev., 53, 222; JACS, 74, 3120; and JACS, 75, 4231.

The electron withdrawing group of the dihalobenzenoid compound can function either through the resonance of the aromatic ring, as indicated by those groups having a high sigma* value (i.e., a sigma* value above about +0.7) or by induction as in perfluoro compounds and other known electron sinks.

The activating group preferably has a high sigma* value, preferably a sigma* value above 1.0. However, groups having a sigma* value of 0.7 and above exhibit sufficient activity to promote the reaction. The reaction rate may be somewhat low when electron withdrawing groups having a sigma* value below 1.0 are employed.

The activating group can be one of two types:
(a) a monovalent group that activate one or more halogens on the same ring or
(b) a divalent group which can activate displacement of halogens on two different rings or which can activate displacement halogens on the same ring.

Specific examples of appropriate monovalent groups (a) include nitro, phenylsulfone, alkylsulfone, cyano, trifluoromethyl, nitroso, and hetero nitrogen (as in pyridine) groups. Specific examples of divalent groups which can activate displacement of halogens on two different rings (b) include:

the sulfone group

the carbonyl group

the vinylene group

the sulfoxide group

the azo-group —N=N—,
the saturated fluorocarbon groups —CF$_2$CF$_2$—, organic phosphine oxides

where R is a hydrocarbon group, and the ethylidene group

where X can be hydrogen or halogen.

Examples of divalent groups which can activate halogens on the same ring (b) include difluorobenzoquinone, 1,4- or 1,5- or 1,8-difluoranthraquinone, and the imide group

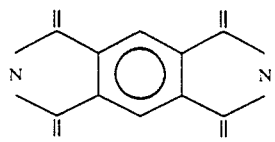

Those skilled in the art will understand that a plurality of electron withdrawing groups may be employed if desired, including electron withdrawing groups having a sigma* value influence on each of the reactive halogen groups of the halobenzenoid compound such that their combined sigma* value is at least about 0.7.

If desired, the polymers of the present invention may be made with mixtures of two or more dihalobenzenoid compounds each of which may have different electron withdrawing groups. Thus, each of the E' residua of the benzenoid compounds present in the polymer structure may be the same or different.

As used herein, E' which is defined as being the "residuum of the benzenoid compound". By this definition it is meant that E' represents the aromatic or benzenoid residue of the compound after the removal of the halogen atoms on the benzenoid nucleus.

Specific azo-group containing dihydric phenols useful in the production of the polymers of the present invention are known to those skilled in the art. Examples of suitable azo group containing dihydric phenols are given in the Hall et al reference noted above. Appropriate azo groups containing dihydric phenols include those represented by the formula:

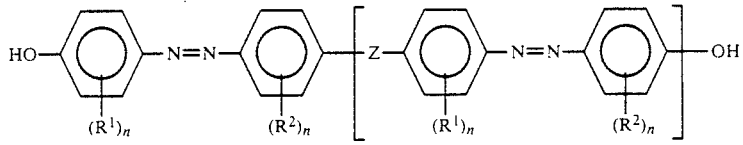

in which
b=0 or 1,
n-0-4, preferably 0-2;
$R^1$ and $R^2$ which may be the same or different each represent H, $C_1$-$C_4$ alkyl, O-alkyl, $C_6$-$C_{12}$ aryl or O-aryl, preferably H, $CH_3$ or phenyl; and
Z represents a divalent connecting radical such as a direct single bond, ketone, O, S, $SO_2$, —N=N—.

Specific azo group containing dihydric phenols which may be used in the practice of the present invention are: 4-4-hydroxyphenyl)azo]-1-phenol, 4,4'-4-hydroxyphenyl)azo]-diphenylether, 4,3'-[4-hydroxyphenyl)azo]-diphenylether.

Where a dihydric phenol which does not contain azo groups is included in the reaction mixture, that dihydric phenol should be included in an amount such that at least 1 mol of the product polymer will be the residuum E, preferably at least 10 mol % and most preferably from about 20 to about 80 mol %.

The specific residuum E" of the dihydric phenol which does not contain azo groups, where this optional material is employed, is not critical. For example, E" may represent a mononuclear phenylene group derived from hydroquinone and resorcinol, or it may be a di- or poly-nuclear residuum. The E" residuum could also be substituted with other inert nuclear substituents such as halogen, alkyl, alkoxy, and like inert substituents.

From a practical standpoint, limitations on polymer molecular weights may be expected when a dihydric phenol which does not contain azo groups or the alkali metal derivative thereof contains strong electron withdrawing groups. The presence of strong electron withdrawing groups may also result in impractically slow reaction rates. It is therefore preferred that the dihydric phenol in which no azo groups are present be a weakly acidic dinuclear phenol. Suitable weakly acidic phenols include: dihydroxy diphenyl alkanes (.bisphenols.) and the nuclear halogenated derivatives thereof. Specific examples of such acidic phenols are 2,2-bis(4-hydroxyphenyl)propane, 1,1-bis(hydroxyphenyl)2-phenyl ethane, bis(4-hydroxyphenyl)methane and their chlorinated derivatives containing one or two chlorines on each aromatic ring. While the halogenated bisphenolic alkanes are more acidic than the non-halogenated bisphenols and hence slower in reactivity in the polymerization process, they do impart valuable flame resistance properties to the product polymers. Other examples of preferred bisphenols are the bisphenols of a symmetrical or unsymmetrical joining group, such as ether oxygen (—O—).

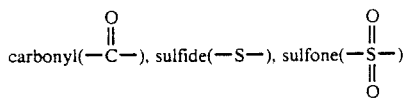

or hydrocarbon residue in which the two phenolic nuclei are joined to the same or different carbon atoms or the residue (such as the bisphenol of acetophenone, the bisphenol of benzophenone, the bisphenol of vinyl cyclohexene, the bisphenol of α-pinene, and like bisphenols where the hydroxyphenyl groups are bound to the same or different carbon atoms of an organic linking group).

The dinuclear phenols which may be used in the practice of the present invention can be characterized by the following structure:

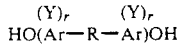

in which
Ar represents an aromatic group, preferably, a phenylene group,
each Y which may be the same or different represents an inert substituent group such as alkali groups having from 1 to 4 carbon atoms, halogen atoms (i.e. fluorine, chlorine, bromine or iodine) or an alkoxy radicals having from 1 to 4 carbon atoms, each r represents an integer having a value from 0 to 4, inclusive, and
R represents a bond between aromatic carbon atoms as in dihydroxydiphenyl; or a divalent radical such as the

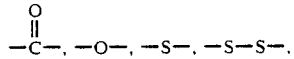

—$SO_2$-radicals; and divalent organic hydrocarbon radicals such as alkylene, alkylidene, cycloaliphatic, alkalicyclic, alkarylene and aromatic radicals and a ring fused to both Ar groups.

Examples of specific dihydric polynuclear phenols include: the bis-(hydroxylphenyl)-alkanes such as 2,2-bis-(4-hydroxyphenyl)propane, 2,4'-dihydroxydiphenylmethane, bis-(2-hydroxyphenyl)-methane, bis-(4-hydroxyphenyl)-methane, bis(4-hydroxy-2,6-dimethyl-3-methoxyphenyl)-methane, 1,1-bis-(4-hydroxyphenyl)ethane, 1,2-bis-(4-hydroxyphenyl)-ethane, 1,1-bis-(4-hydroxy.2-chlorophenyl)-ethane, 1,1-bis-(3methyl-4-hydroxyphenyl)-propane, 1,3-bis-(3-methyl-4-hydroxyphenyl)-propane, 2,2-bis-(3-phenyl-4-hydroxyphenyl)-propane, 2,2-bis-(3-isopropyl-4-hydroxyphenyl)-pentane, 2,2-bis-(4-hydroxyphenyl)heptane, bis-(4-hydroxyphenyl)phenylmethane, 2,2-bis-(4-hydroxyphenyl)-1-phenyl-propane, 2,2-bis-(4-hydroxyphenyl)-1,1,1,3,3,3-hexafluoropropane and the like; di(-hydroxyphenyl)sulfones such as bis-(4-hydroxyphenyl)-sulfone, 2,4'-dihydroxydiphenyl sulfone, 5'-chloro-4,4'-dihydroxydiphenyl sulfone, and the like; di(hydroxyphenyl)-ethers such as bis-(4-hydroxyphenyl)-ether, the 4,3'- and 2,2'-, 2,3'-dihydroxydiphenyl ether, bis-(4-hydroxy-3-isobutylphenyl)-ether, bis-(4-hydroxy-3-isopropylphenyl)-ether, bis-(4-hydroxy-3-chlorophenyl ether, bis-(4-hydroxy-3-fluorophenyl)-ether, bis-(4-hydroxy-3-bromophenyl)-ether, bis-(4-hydroxynaphthyl)-ether, bis-(4-hydroxy-3-chloronaphthyl) ether, 4,4'-dihydroxy-b 3,6-dimethoxydiphenyl ether, 4,4'-dihydroxy-2,5-diethoxydiphenylether, and like materials.

A preferred form of the polyarylene polyethers of this invention are those prepared using a dihydric polymers nuclear phenols of the following four types, including the derivatives thereof which are substituted with inert substituent groups:

(a)

in which
R represents hydrogen, lower alkyl, lower aryl and the halogen substituted groups thereof and each R may be the same or different;

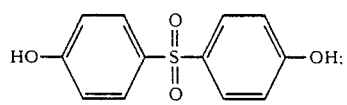
(b)

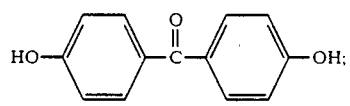
(c)

and

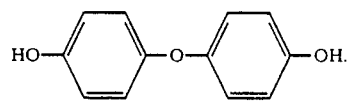
(d)

The particular structure of the dihydric phenol moiety of the alkali metal salt reactant is not critical. However, as would be expected, this moiety or residuum in the polymer chain can alter or vary the properties of the resultant polymer produced. Similarly, the reaction rate, optimum reaction temperature and like process variables can be varied by selection of a particular dihydric phenol and the alkali metal salt thereof.

A mixture of two or more different dihydric phenols may also be used in the practice of the present invention. Thus, the —E″— residua in the polymer structure can be the same or different aromatic residua.

E″ which is defined as being the "residuum of the dihydric phenol . Residuum is intended to mean the residue of the dihydric phenol after the removal of the two aromatic hydroxyl groups. The polyarylene polyethers of the present invention contain recurring groups of the residuum of the dihydric phenol and the residuum of the benzenoid compound bonded through aromatic ether oxygen atoms.

The polymerization reaction of the present invention is carried out in the liquid phase in an organic solvent at elevated temperature. While it has been found that the alkali metal salt of the dihydric phenol has only limited solubility in these solvents, this feature makes it easy to control the reaction. The slow addition of one reactant to the other will produce satisfactory high molecular weight polymers.

The solvents which may be used to produce the polymers of the present invention include aprotic amides, sulfoxides and sulfones. Examples of suitable aprotic amides are N-alkylpyrolidinones such as N-methylpyridinone and dimethylacetamide. N-methylpyridinone is the solvent which is most preferred for the process of the present invention because its high boiling point makes it possible to carry out the polymerization reaction at relatively high reaction temperatures. At higher temperatures, higher viscosities can be tolerated, premature precipitation is avoided and the reaction times are faster. Further, bisphenates are soluble in N-methylpyridinone (NMP) thereby making it possible to obtain polymers of high molecular weight.

The sulfoxide and sulfone solvents useful in the practice of the present invention include those represented by the formula $$R-S(O)_t-R$$

in which
each R represents a monovalent lower hydrocarbon group free of aliphatic unsaturation on the alpha carbon atom, and preferably contains less than about 8 carbon atoms or when connected together represents a divalent alkylene group and t represents 1 or 2.

In these sulfoxide and sulfone solvents all oxygens and two carbon atoms are bonded directly to the sulfur atom. The preferred sulfoxide and sulfone solvents are those represented by the formulae

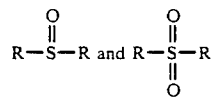

in which
each R represents a lower alkyl group such as methyl, ethyl, propyl, butyl and like groups or an aryl group such as phenyl and alkyl phenyl groups or the R groups are interconnected as in a divalent alkylene bridge such as

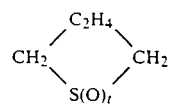

found in thiophene oxides and dioxides.

Specific examples of suitable sulfoxide and sulfone solvents include dimethylsulfoxide, dimethylsulfone, diethylsulfoxide, diethylsulfone, diisopropylsulfone, tetrahydrothiophene, 1,1-dioxide (commonly called tetramethylene sulfone or sulfolane) and tetrahydrothiophene-1 monoxide.

Dimethylsulfoxide is particularly useful because it is a solvent for a wide variety of reactants as well as for the polymer product of the reaction. Compounds having aliphatic unsaturation on the $\alpha$ carbon atom, such as occurs in divinyl sulfone and sulfoxide, should not be used because such materials tend to be reactive and polymerize under the conditions of this reaction. However, unsaturation on the $\beta$ carbon atoms or one further removed from the sulfur atom can be tolerated and such solvents can be employed in this reaction.

It is essential in the polymerization that the solvent be maintained substantially anhydrous before and during the reaction. While amounts of up to about one percent water can be tolerated, and are somewhat beneficial when employed with fluorinated dihalobenzenoid compounds, amounts of water substantially greater than this should generally be avoided. The reaction of water with the dihalobenzenoid compound leads to formation of phenolic species is that only low molecular weight products are obtained. Due to the nature of the polymerization reaction of the dihalobenzenoid compound with an equimolar amount of the alkali metal salt of the dihydric phenol, the presence of water in any significant amount affects the stoichiometry of the reaction in a manner which limits the molecular weight obtainable. Consequently, in order to secure high molecular weight polymers, the reaction mixture should be substantially anhydrous, and preferably have less than 0.5 percent by weight water.

The presence of significant amounts of water and the problems associated with such water may be essentially avoided by using a dry crystalline alkali metal salt of the dihydric phenols as the reactant. However, it is often more convenient to form the alkali metal salt in situ in the reaction solvent in the two-step process described above.

Where the alkali metal salt of the dihydric phenol is prepared in situ in the reaction solvent, the dihydric phenol(s) and an alkali metal hydroxide are admixed in essentially stoichiometric amounts and substantially all of the water of neutralization is removed (preferably by distillation of a water-containing azeotrope) from the solvent-metal salt mixture.

To remove water from the reaction mixture, it is advantageous to add an azeotrope-forming liquid to the reaction mixture. Suitable azeotrope-forming liquids include toluene, benzene, xylene, halogenated benzenes and other inert organic azeotrope-forming liquids. Toluene is particularly preferred. The alkali metal hydroxide, dihydric phenol and small amounts of the azeotrope former may then be heated to reflux for several hours to remove the azeotrope. While this technique of distilling a water-containing azeotrope is preferred, any other technique for removing essentially all of the water could also be used.

It is not necessary to remove all of the azeotrope former before the reaction of the alkali metal salt of the bisphenol(s) with the dihalobenzenoid compound. In fact, it is desirable in some instances to employ an excess of that needed to remove all of the water because the remaining azeotrope former will act as a cosolvent or inert diluent with the aprotic amide or sulfone or sulfoxide principal solvent. Benzene, heptane, xylene, toluene, chlorobenzene, dichlorobenzene and like inert liquids are examples of azeotrope formers which can be beneficially employed in excess.

The azeotrope former can be either miscible or immiscible with aprotic amide the sulfone or sulfoxide solvent. If it is not miscible, the azeotrope former should be selected from materials (such as heptane) which will not cause precipitation of the polymer in the reaction mass and which will remain inert and immiscible in the reaction mass. If the azeotrope former would cause precipitation of the polymer, it should be removed almost completely from the reaction mass before initiating polymerization. Azeotrope formers which are miscible with the major solvents and which also act as cosolvents for the polymer during polymerization are therefore preferred. Toluene, chlorobenzene, dichlorobenzene and xylene are azeotrope formers of this class. Preferably the azeotrope former should have a boiling point below the decomposition temperature of the solvent and be stable and inert under the conditions of the polymerization process. The azeotrope former should particularly be inert with respect to the alkali metal hydroxide when the alkali metal salt of the dihydric phenol is prepared in situ in the presence of the inert diluent or azeotrope former.

It has been found that toluene, chlorobenzene and o-dichlorobenzene serve particularly well as the inert diluent and are able to significantly reduce the amount of the aprotic amide, sulfone or sulfoxide solvent necessary. A cosolvent mixture of up to 50 percent toluene with NMP, for example, not only permits the formed polymer to remain in solution and thus produce high molecular weight polymers, but also provides a very economical processing system, and an effective dehydration operation. These materials are also completely stable to the alkali metal hydroxides employed in the in situ neutralization of the hydroxy groups of the dihydric phenol.

Any of the alkali metal hydroxides may be used in the practice of the present invention. More specifically, any alkali metal salt of the dihydric phenol can be used as one reactant. Potassium and cesium salts have been found to react considerably faster than the sodium salts. The potassium salts are preferred. The alkali metal salt should be the double metal salt (i.e., both aromatic hydroxyl groups are saponified) in order to prepare these products. Single metal salts ordinarily limit the molecular weight of the product. While single metal salts may be useful as chain terminators or molecular weight regulators near the end of the reaction period, the reaction should be substantially completely carried out with the double alkali metal salt of the dihydric phenol. The alkali metal moieties of this compound can be the same or different alkali metals.

Substantially equimolar amounts of the alkali metal double salt of the dihydric phenols (or a dihydric phenol for in situ conversion to the salt) and the dihalobenzenoid compound are simultaneously contacted with a solvent mixture comprising an azeotrope former and an aprotic amide or sulfoxide or sulfone reaction solvent in a ratio of azeotrope former to solvent of from about 10:1 to about 1:1 by weight based on the combined weight of the azeotrope former and reaction solvent. It has been found that when water is present in this solvent mixture, a phase separation occurs even between normally miscible liquids thus creating two liquid phases. When this phase separation occurs, the water and hydrated alkali metal double salt of a dihydric phenol are preferentially dissolved in the aprotic amide or sulfoxide or sulfone reaction solvent phase and the dihalobenzenoid compound is preferentially dissolved in the azeotrope former phase. The initial ratio of azeotrope former to reaction solvent is significant in this respect because with lesser amounts of azeotrope former, two liquid phases are not formed and undesirable hydrolysis of the dihalobenzenoid compound occurs. Only when the azeotrope former and solvent are used in quantities such that the ratio of azeotrope former to solvent is within the 10:1 to 1:1 ratio range does a phase separation which isolates the dihalobenzenoid compound before it is hydrolyzed by the water in the system occur.

It should be noted that if a dry crystalline alkali metal salt of a dihydric phenol is employed, the problem of maintaining anhydrous conditions is essentially avoided. However, drying the salt and keeping it dry during transfer and charging is difficult. It has been found to be more advantageous to employ a hydrated alkali metal salt which is dehydrated in the reaction mass by removing the water of hydration. Water may then be present or formed in the reaction mass as the water of hydration of a hydrated alkali metal salt, as the water of neutralization formed during the in situ conversion of a dihydric phenol to the alkali metal double salt, or as water present in either the azeotrope former or the reaction solvent. It has been found that during the in situ conversion, the hydrated salt is formed first. This hydrated salt is then dehydrated upon the removal of water.

When the two liquid phases are formed, it is important that the water in the system be removed as quickly as possible, usually by refluxing the mixture at about the boiling point of the azeotrope former until substantially all of the water is removed. During the water removal, the dehydrated alkali metal double salt, which is insoluble in the reaction solvent at the reflux temperature, precipitates. That all of the water has been removed is usually signaled by discontinuation of precipitate formation and of azeotrope formation, and by the formation of one liquid phase when miscible liquids have been used.

After the water has been removed, excess azeotrope former may be removed by distillation until the ratio of azeotrope former to reaction solvent is in the range of from about 1:1 to about 1:10. Only when the amount of azeotrope former is reduced to come within these ratios does significant polymerization occur.

The reaction between the dihalobenzenoid compound and the alkali metal salt of the bisphenol(s) proceeds on an essentially equimolar basis. This can be slightly varied but variation by as little as 5 percent from equal molar amounts significantly reduces the molecular weight of the polymer formed. Since the desirable properties of the polymers of the present invention are attributable to their high molecular weights, use of essentially equal molar amounts of reactants is preferred.

The reaction of the dihalobenzenoid compound with the alkali metal salt of the dihydric phenol proceeds upon the application of heat to the reaction mixture without a catalyst. Since the polymerization reaction is conducted in the liquid phase of the solvent, the selected reaction temperature should be below the ambient boiling point of solvent and above its freezing point. Solvents such as dimethyl sulfone and tetramethylene sulfone (sulfolane) freeze at about room temperature. It is obvious that with such materials, elevated temperatures are desirable. NMP has a boiling point greater than 200° C. so that reaction temperatures as high as 190° C. can be used when NMP is the solvent.

Also desirable is the exclusion of oxygen from the reaction mass to avoid any possibility of oxidative attack to the polymer or to the principal solvent during polymerization, particularly at higher reaction temperatures. Nitrogen blanketing of the reaction vessel is one technique which is effective for excluding oxygen from the reaction mixture.

While the specific reaction temperature is not critical, it has been found that at temperatures below about room temperature, the reaction time necessary to obtain high molecular weights is undesirably long. Temperatures above room temperature and generally above 100° C., are preferred because processing times at such temperatures are shorter which makes the system more economical. Most preferred are temperatures between about 120° C. to 190° C. Higher temperatures could thoretically be employed, provided that care is taken to prevent degradation or decomposition of the reactants, the polymer and the solvents employed.

Temperatures higher than 100° C. are also preferred because the polymer remains in solution during the reaction. High molecular weights are generally obtained only when the growing polymer chain is dissolved in the solvent. Once the polymer precipitates from the solvent, its growing ceases. It has also been found that the addition of a second cosolvent to the reaction mixture or increasing the reaction temperature will resolvate the precipitated polymer and thus make it possible for the polymerization to continue until the desired high molecular weight is obtained. Cosolvents suitable for use to increase the fluidity of the reaction mass are diphenyl ether, anisole, xylene, chlorobenzene or dichlorobenezene, toluene and like materials even though other azeotrope formers may have previously been used or are still in the reaction mass.

The reaction temperature can be effectively increased (even above the normal boiling point of the solvent or mixture of solvents) by the use of pressure in the system. However, for most practical reactions contemplated herein, atmospheric pressures are quite adequate. Pressures as high as 1000 psig or more could, however, be employed.

The polymerization reaction mass is preferably a true solution at the reaction temperature (except for by-product inorganic salt which is generally insoluble in the reaction mass). However, the reaction will still proceed if the reaction mass is a swollen gel of solvent and dissolved polymer if high solids reaction conditions are desired. The extent of polymerization in a swollen gel will depend upon the amount of solvent initially present and on the power of the agitator in the reaction vessel. It has been found that equal parts by weight of solvent and of total reactants generally give optimum results. However, if adequate stirring and means for stripping the solvent from the polymer mass are provided, as little as one part solvent to five or more parts total reactants can be used successfully. Since the solvents are quite expensive it is advantageous to use as little as possible, and preferably to use a cosolvent or inert diluent to provide sufficient fluidity to the reaction mass.

If the polymer precipitates from the solvent at the reaction temperature and such polymer is found to be of sufficiently high molecular weight for the intended use, the reaction mass may be a mixture of the solvent in which the reactants are dissolved therein and the polymer is present as a precipitate. However, this precipitation technique does not produce polymers having as high a molecular weight as when the polymer remains dissolved in the reaction medium.

The polymer may be recovered from the reaction mass by any of the techniques known to those skilled in the art. Examples of appropriate recovery techniques are precipitation induced by cooling the reaction mass or by adding a non-solvent for the polymer and stripping off the solvent at reduced pressures or elevated temperatures.

Molecular weight of the polymer can be easily controlled in this process by the addition of a precipitating solvent to the reaction mixture when the inherent viscosity of the polymerization mass is high enough to indicate that the desired molecular weight has been achieved. It is also possible to terminate the growing polymer chain by the addition of a monofunctional chain terminator, such as an alkyl halide or other suitable coreactant.

Since the polymerization reaction results in the formation of the alkali metal halide on each coupling reaction, it is preferred to either filter the salts from the polymer solution or to wash the polymer to remove substantially all of the salts. The precipitation of the polymer from the reaction mass as a fluffy powder or fine granule is preferred, but chain termination is also beneficial because it results in a more stable polymer.

The polymers of the present invention are characterized by high molecular weights. The molecular weight of these polymers is indicated by their inherent viscosity in indicated solvents. As is well known in the art, the viscosity of a resin solution bears a direct relationship to the weight average molecular size of the polymer chains, and is the most important single property that can be used to characterize the degree of polymerization. The inherent viscosity limitation assigned to the polymers of the present invention are therefore to be understood as significant in reflecting molecular size rather than the viscosity per se. The inherent viscosity values given herein are of significance only relative to each other rather than in any absolute sense. Other polyethersolvent systems can also be employed to determine the relative molecular weight of these polymers. When a solvent other than chloroform is employed, the average molecular size relationship can readily be established by reference to the inherent viscosity values defined herein even though the numerical inherent viscosity values of the alternative system may be different.

Most of the polymers of the present invention are readily soluble in chloroform, tetrachloroethane or other similar solvents. An inherent viscosity above about 0.35 is an indication of a tough, strong fiber- or film-forming polymer. Polymers having an inherent viscosity above 0.4 are particularly advantageous.

The preferred polymers of the present invention are represented by the formulae given in Examples 1-16 below.

The invention is further illustrated but is not intended to be limited by the following examples in which all parts and percentages are by weight, unless otherwise specified.

EXAMPLES

Example 1

The azo bisphenol represented by the structure

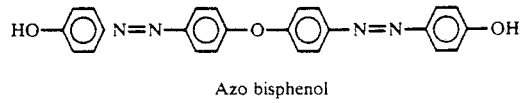

Azo bisphenol was used to prepare the polymers described in this and subsequent examples. Difluorodiphenyl sulfone, p,p'-dihydroxybiphenyl, and potassium carbonate were used as received from Aldrich Chemical Company. N-methyl-2-pyrolidinone (NMP) was either vacuum distilled from $P_2O_5$ or used as received (HPLC grade). Toluene was used as received.

Difluorodiphenylsulfone (5.0 g; 0.02 mol), p,p'-dihydroxybiphenyl (3.35 g; 0.018 mol), the azo bisphenol prepared as described above (0.82 g; 0.002 mol), and $K_2CO_3$ (4.0 g; 0.028 mol) were combined with NMP (100 mL) and toluene (55 mL) in a 250 mL 3-neck flask. An overhead stirrer, Dean-Stark trap (12 mL volume) with condenser and $N_2$ outlet, and a Claissen adapter with $N_2$ inlet and thermometer (or thermocouple) were attached and the entire sytem was purged with $N_2$ for 10 min. A dark red solution formed. Under a continuous $N_2$ flow, the solution was heated with stirring to 155° C. This temperature was maintained for 5 hours. During this time a toluene/$H_2O$ (approx. 0.5 mL) separated from the $H_2O$ toluene azeotrope.

The toluene/$H_2O$ azeotrope (12 mL) was then drained from the Dean-Stark trap. The temperature rose to 172° C. over 1 hour. During this time, all joints were thoroughly dried with a heat gun. The deep red, viscous, polymerization mixture was allowed to cool to room temperature and filtered through a glass frit so as to remove any precipitated salts. Acetic acid (approx. 2 mL) was added to acidify any phenolate end groups. The polymerization solution was poured into a large excess of MeOH to precipitate a fibrous yellow polymer. This polymer was collected, boiled in $H_2O$ for 1 hour, collected and dried in vacuo for 8 hours at approx. 60° C.

Polymer characterization

Recovered yield: 7.95 g (95%)

Inherent viscosity in NMP at 30° C. (0.5 g/dL); 0.87 dL/g

Molecular weight as measured by GPC in THF (polystyrene standard)
$M_w = 42,600$
$M_2 = 22,900$

| FTIR spectroscopy: | $(cm^{-1})$ assignment | |
|---|---|---|
| | 3040 (w) | aromatic C—H stretch |
| | 1320, 1295 (m) | sulfone doublet |
| | 1240 (vs) | aromatic ether |
| | 87,830 | C—H out of plane bend |

UV/Vis spectroscopy: max = 276 nm, 356nm

Thermal analysis: Tg-222° C.

Thermal gravimetric analysis (TGA) 10% weight loss in $N_2$-535° C.

From NMP a dark yellow, but clear film was cast. This film was very tough and could be folded repeatedly without cracking. The structural formula of the polymer is shown below.

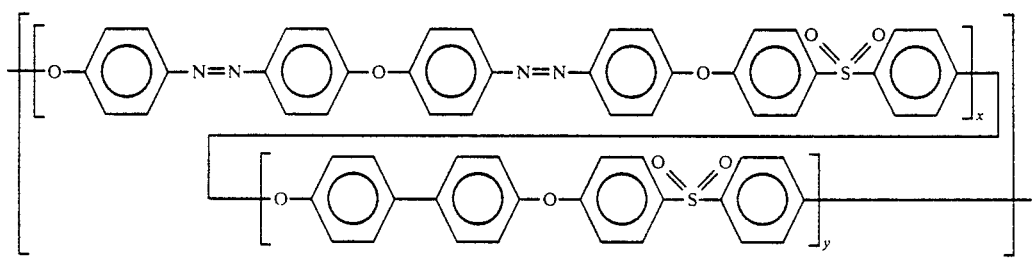

x = 10% mole; y = 90% mole

Example 2

The procedure of Example 1 was essentially repeated except that the amounts of the following reagents were varied: p,p'-dihydroxybiphenyl (2.98 g, 0.016 mol); azo bisphenol, (1.64 g; 0.004 mol).

The final product was a fibrous yellow polymer.

Polymer characterization

Inherent viscosity in NMP at 30° C.(0.5 g/dL): 0.78 dL/g

Molecular weight as measured by GPC in THF (polystyrene standard):
$M_w = 55,700$
$M_n = 24,000$

| FTIR spectroscopy: | (cm$^{-1}$) assignment | |
|---|---|---|
| | 3040 (w) | aromatic C—H stretch |
| | 1320, 1295 (m) | sulfone doublet |
| | 1240 (vs) | aromatic ether |
| | 870,830 | C—H out of plane bend |

UV/Vis spectroscopy: $\lambda max = 276,356$ nm

Thermal analysis: $Tg = 223°$ C. TGA (10%, $N_2$) = 520° C.

Example 3

Experimental procedure

The procedure of Example 1 was essentially repeated except that the amounts of the following reagents were varied: p,p'-dihydroxybiphenyl (1.86 g; 0.01 mol), azo bisphenol (4.1 g; 0.0 mol).

The final product was a fibrous yellow polymer.

Polymer characterization

Inherent viscosity in NMP at 30° C. (0.5 g/dL): 0.64 dL/g

Molecular weight as measaured by GPC in THF (polystyrene standard):
$M_w = 55,100$
$M_n = 20,400$

| FTIR spectroscopy: | (cm$^{-1}$) assignment | |
|---|---|---|
| | 3040 (w) | aromatic C—H stretch |
| | 1320, 1295 (m) | sulfone doublet |
| | 1240 (vs) | aromatic ether |
| | 870,830 | C—H out of plane bend |

UV/Vis spectrosusis: $\lambda max = 276$nm, 356nm

Thermal analyusis: $Tg = 203°$ C. TGA (10%,

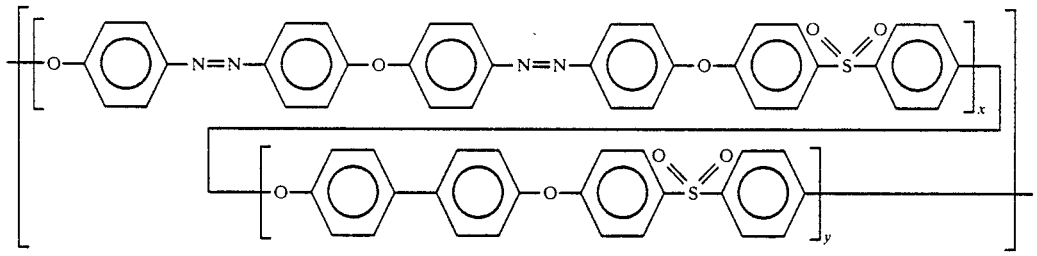

x = 20% mole; y = 80% mole $N_2) = 460°$ C.

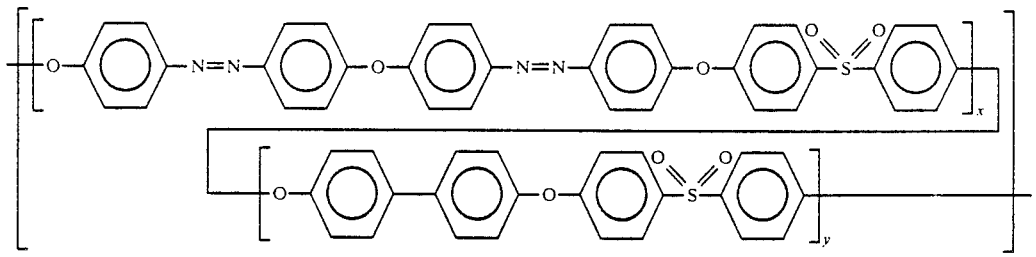

Example 4

The procedure of Example 1 was essentially repeated except that the amounts of the following reagents were varied: p, p'-dihydroxybiphenyl (0.93 g; 0.005 mol), azo bisphenol (6.15 g; 0.015 mol).

The final product was a fibrous yellow polyer.

Polymer characterization

Inherent viscosity in NMP at 30° C. (0.5 g/dL); 0.44 dL/g

Molecular weight as measured by GPC in THF (polystyrene standard):
 $M_w = 55,400$
 $M_n = 26,200$
Thermal analysis: Tg=202° C. TGA (10%, N2) =500° C.

Elemental analysis: C-69.2 (calc); 68.3 (meas). H-3.87 (calc); 4.00 (meas). N-8.97 (calc); 8.90 (meas).

| FTIR spectroscopy: | (cm$^{-1}$) | assignment |
|---|---|---|
| | 3040 (w) | aromatic C—H stretch |
| | 1320, 1295 (m) | sulfone doublet |
| | 1240 (vs) | aromatic ether |
| | 870, 830 | C—H out of plane bend |

UV/Vis spectroscopy: λMax=276 nm, 356 nm

Thermal analysis: Tg=185° C. TGA (10%, N$_2$)=417° C.

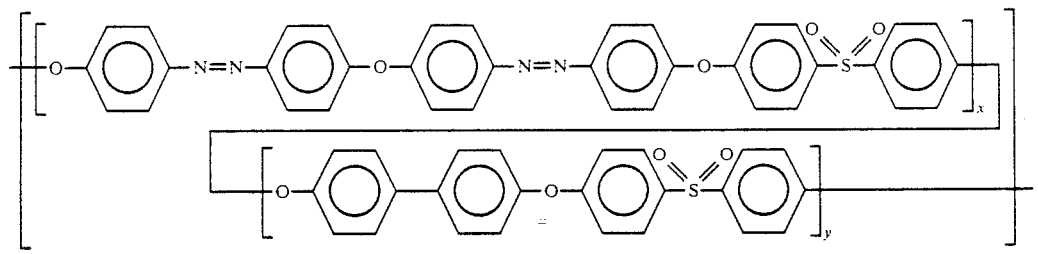

x = 100% mole; y = 0% mole

Example 6

The procedure of Example 1 was essentially repeated except that 2,2-bis(4-hydroxyphenyl)propane (3.65 g; 0.016 mol) was used in place of p,p'-dihydroxybiphenyl and the amounts of the following reagents were varied: difluorodiphenylsulfone (5.0 g; 0.02 mol); azo bisphenol (1.64 g; 0.004 mol).

The final product was a fibrous, yellow polymer.

Polymer characterization

Inherent viscosity in NMP at 30° C. (0.5 g/dL); 0.50 dL/g

Molecular weight as measaured by GPC in thf (polystyrene standard);
 $M_w = 47,800$
 $M_n = 23,500$

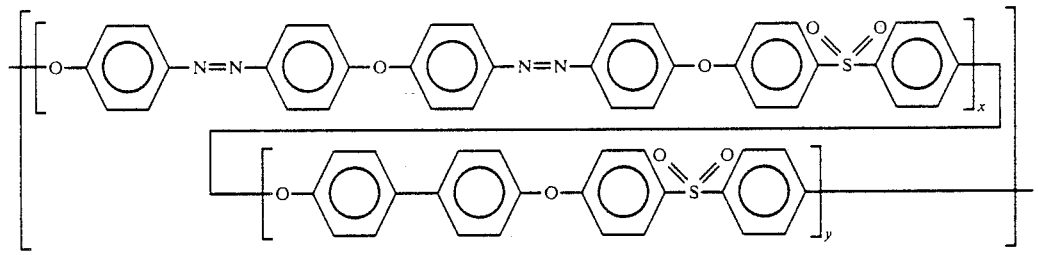

x = 75% mole; y = 25% mole

Example 5

The procedure of Example 1 was essentially repeated except that the amounts of the following reagents were varied: p,p'-dihydroxybiphenyl (none used), azo bizphenol (8.2 g; 0.02 mol). This is the homopolymer from difluorodiphenylsulfone and the azo bisphenol.

The final product was a fibrous, yellow polymer.

Polymer characterization

Inherent viscosity in NMP at 30° C. (0.5 g/dL); 0.35 dL/g

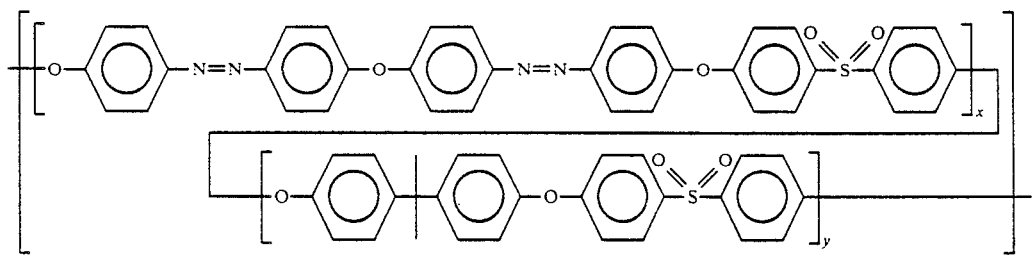

x = 20% mole; y = 80% mole

Example 7

The procedure of Example 1 was essentially repeated except that 1,6-bis-(4-hydroxyphenoxy)hexane (3.00 g; 0.01 mol) was used in place of p,p'-dihydroxybiphenyl and the amounts of the following reagents were varied: diflurodiphenylsulfone (5.0 g; 0.02 mol); azo bisphenol (4.1 g; 0.01 mol).

The final product was a fibrous, yellow polymer.

Polymer characterization

Inherent viscosity in NMP at 30° C. (0.5 g/dL); 0.36 dL/g

Thermal analysis: $Tg=158°$ C. TGA (10%, $N_2$)=440° C.

the solution was heated with stirring to 155° C. This temperature was maintained for 5 hours. During this time a toluene/$H_2O$ azeotrope distilled into the Dean-Stark trap and a small amount Df $H_2O$ (approx. 0.5 mL) separated from the $H_2O$ toluene azeotorope.

The toluene/$H_2O$ azeotrope (12 mL) was then drained from the Dean-Stark trap. The temperature rose to 172° C. over 1 hour. During this time, all joints were thoroughly dried with a heat gun. The deep red, viscous, polymerization mixture was allowed to cool to room temperature and filtered through a glass frit zo as to remove any precipitated salts. Acetic acid (approx 2 mL) was added to acidify any phenolate end groups. The polymerization solution was poured into a large excess of MeOH to precipitatea fibrous yellow polymer.

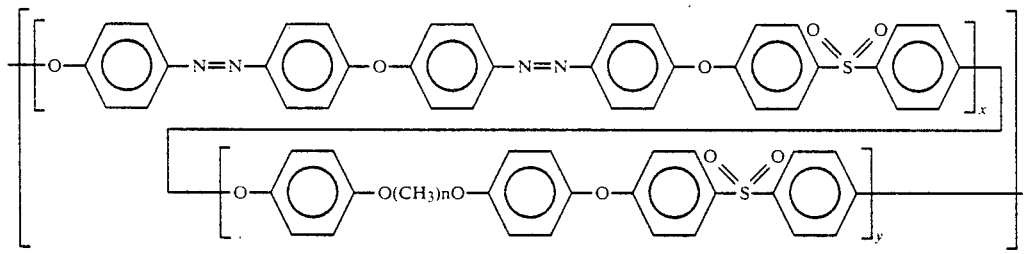

x = 50% mole; y = 50% mole; n = 6

Example 8

Difluorobenzophenone was used as received from Aldrich Chemical Company. All other reagents were the same as were used in Example 1.

Difluorobenzophenone (4.36 g; 0.02 mol), 2,2,-bis-(4-hydroxyphenyl)propane (4.52 g; 0.0198 mol), azo bisphenol (0.082 g; 0.0002 mol), and $K_2CO_3$ (4.0 g; 0.028 mol) were combined with NMP (1.00 mL) and toluene(55 mL) in a 250 mL 3-neck flask. An overhead stirrer, Dean-Stark trap (12 mL volume) with condenser and $N_2$ outlet, and a Claissen adapter with $N_2$ inlet and thermometer (or thermocouple) were attached and the entire system was purged with $N_2$ for 10 minutes. A dark red solution formed. Under a continuous $N_2$ flow, This polymer was collected, boiled in $H_2O$ for 1 hours, collected and dried in vacuo for 8 hours at approx. 60° C.

Polymer characterization

Inherent viscosity in NMP at 30° C. (0.5 g/dL); 0.41 dL/g

Molecular weight as measured by GPC in THF (polystyrene standard):

$M_w=44,800$
$M_n=23,100$

UV/Vis spectroscopy: $\lambda max=293$ nm

Thermal analysis: $Tg=155°$ C. TGA (10%, $N_2$)=550° C.

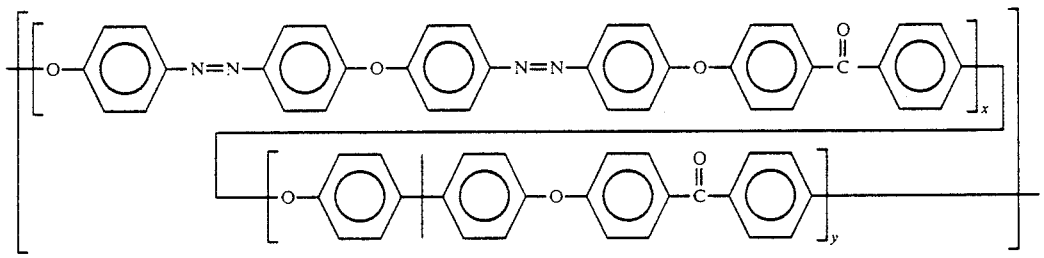

x = 1% mole; y = 99% mole

Example 9

The procedure of Example 8 was essentially repeated except that the amounts of the following reagents were varied: 2,2-bis-(4-hydroxyphenyl)propane (4.11 g; 0.018 mol); azo bisphenol (0.82 g; 0.002 mol).

Polymer characterization

Inherent viscosity in NMP at 30° C. (0.5 g/dL); 0.31 dL/g
Thermal analysis: Tg=148° C.
TGA (10%, $N_2$)=500° C.

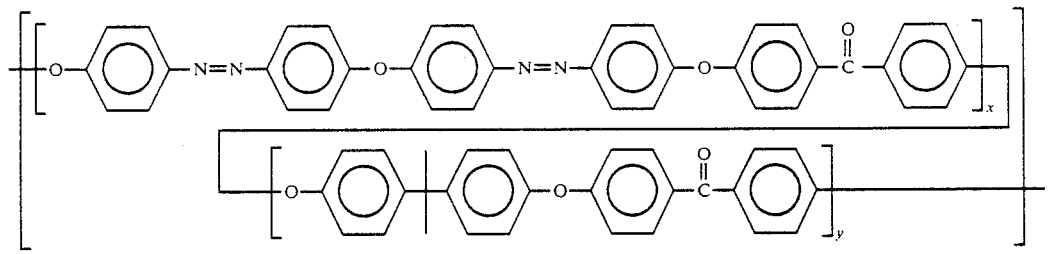

x = 20% mole; y = 80% mole

The final polymer was a fibrous yellow polymer.

Polymer characterization

Inherent viscosity in NMP at 30° C. (0.5 g/dL): 0.27 dL/g
UV/Vis spectroscopy: λmax=293 nm, 357 nm
Thermal analysis: Tg=142° C. TGA (10%, $N_2$)=525° C.

Example 11

The procedure of Example 8 was essentially repeated except that the amounts of the following reagents were varied: 2,2-bis-(4-hydroxyphenyl)propane (2.28 g; 0.01 mol); azo bisphenol (4.1 g; 0.01 mol).

The final polymer was a fibrous yellow polymer.

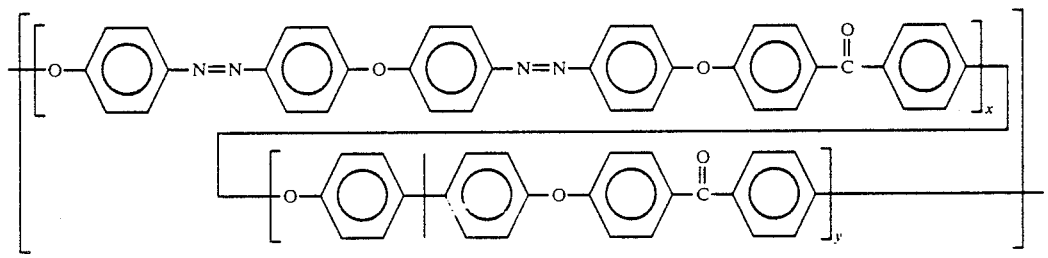

x = 10% mole; y = 90% mole

Example 10

The procedure of Example 8 was essentially repeated except that the amounts of the following reagents were varied: 2,2-bis-(4-hydroxyphenyl)propane (3.65 g; 0.016 mol); azo bisphenol (1.64 g; 0.004 mol).

The final polymer was a fibrous yellow polymer.

Polymer characterization

Elemental analysis: C-78.5 (valc); 77.6 (meas).
H-4.70 (calc); 4.7 (meas).
N-5.60 (calc); 5.40 (meas).
UV/Vis spectroscopy: max=293 nm, 362 nm
Thermal analysis: Tg-167° C. Tm=339° C. Δ H=39 J/g TGA (10%, $N_2$)=475° C.

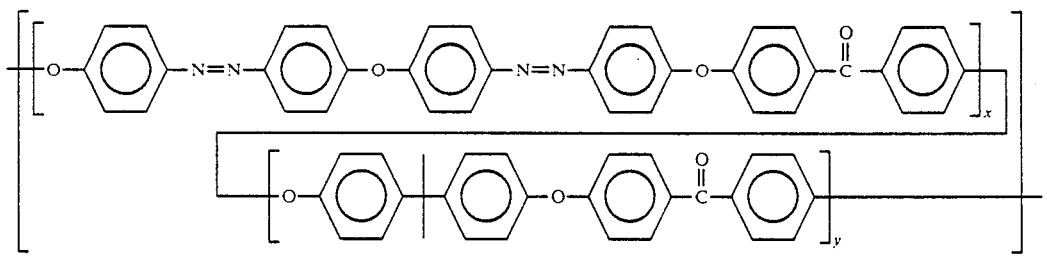

x = 50% mole; y = 50% mole

Example 12

The procedure of Example 8 was essentially repeated except that the amounts of the following reagents were varied: 2,2-bis-(4-hydroxyphenyl)propane (1.13 g; 0.005 mol); azo bisphenol (6.15 g; 0.015 mol).

The final polymer was a powdery yellow polymer.

Polymer characterization

Inherent viscosity in NMP at 30° C. (0.5 g/dL); 0.28 dL/g

UV/Vis spectroscopy $\lambda$max = 295 nm, 362 nm

Thermal analysis: Tm = 337° C.; $\Delta$ H = 39 J/g TGA (10% $N_2$) = 460° C.

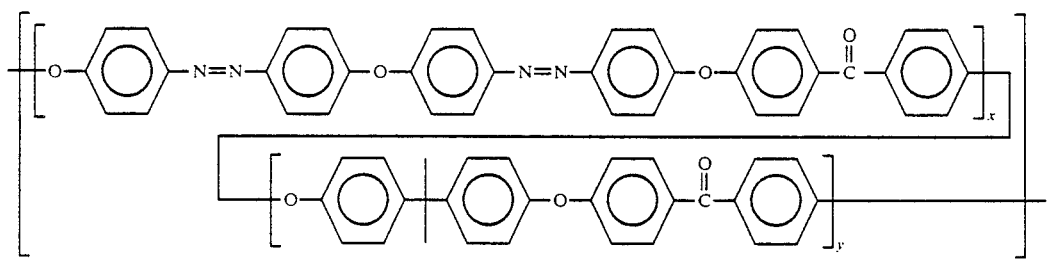

x = 75% mole; y = 25% mole

Example 13

The procedure of Example 8 was essentially repeated except that the amounts of the following reagents were varied: 2,2,-bis-(4-hydroxyphenyl)propane (none); azo bisphenol (8.2 g; 0.02 mol).

The final polymer was a powdery yellow polymer.

Polymer characterization

Elemental analysis: C-75.5 (calc): 73.8 (meas). H-4.10 (calc): 4.10 (meas). N-9.50 (calc); 9.20 (meas).

UV/Vis spectroscopy: $\lambda$max = 294 nm, 362 nm. Tm-332° C.; $\Delta$ H = 25 J/g, TGA (10%, $N_2$) = 425° C.

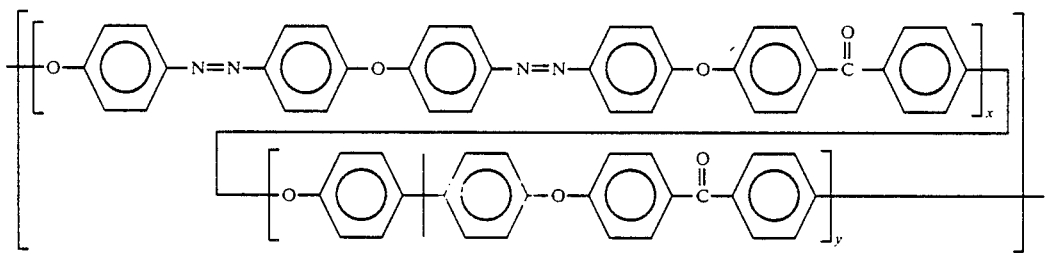

x = 100% mole; y = 0% mole

Example 14

The procedure of 10 was essentially repeated except that the difluorobenzophenone monomer was recrystallized. The yellow polymer formed a tough, transparent yellow film.

Polymer characterization

Inherent viscosity in NMP at 30° C. 0.5 g/dL); 0.60 dL/g

Thermal analysis: Tg = 158° C. TGA (10%, $N_2$ = 525° C.

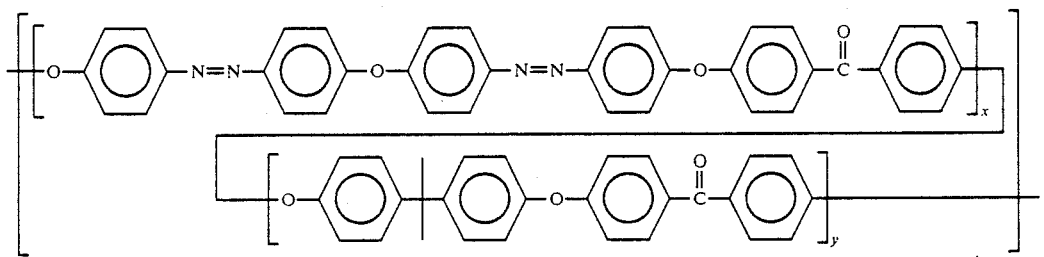

x = 20% mole; y = 80% mole

Example 15

This example is similar to Example 8 except that 2,2-bis-(4-hydroxyphenyl)propane was replaced by (4-hydroxy)-1,6-diphenoxyhexane and the bisphenol monomers were added sequentially.

Difluorobenzophenone (4.36 g; 0.02 mol), (4-hydroxy)-1,6-diphenoxyhexane (3.0 g; 0.01 mol), and $K_2CO_3$ (4.0 g; 0.028 mol) were combined with NMP and toluene (55 mL) in a 250 mL 3-neck flask. An overhead stirrer, Dean-Stark trap (12 mL volume) with condenser and $N_2$ outlet, and a Claissen adapter with $N_2$ inlet and thermometer (or thermocouple) were attached and the entire system was purged with $N_2$ for 10 min. Under a continuous $N_2$ flow, the solution was heated with stirring to 145° C. After 3 hours the solution was cooled to approx. 90° C. and azo bisphenol (4.1 g; 0.01 mol) was added. The temperature was again raised to 145° C. and this temperature was maintained for an additional 3 h. A dark red solution formed. During this time a toluene/$H_2O$ azeotrope distilled into the Dean-Stark trap and a small amount of $H_2O$ (approx. 0.5 mL) separated from the $H_2O$ toluene azeotrope.

The toluene/$H_2O$ azeotrope (12 mL) was then drained from the Dean-Stark trap. The temperature rose to 172° C. over 1 hour. During this time, all Joints were thoroughly dried with a heat gun. The deep red, viscous, polymerization mixture was allowed to cool to room temperature and filtered through a glass frit so as to remove any precipitated salts. Acetic acid (approx. 2 mL) was added to acidify an phenolate end groups. The polymerization solution was poured into a large excess of MeOH to precipitate a fibrous yellow polymer. This polymer was collected, boiled in $H_2O$ for 1 hours, collected and dried in vacuo for 8 hours at approx. 60° C.

The final polymer was a fibrous yellow polymer.

Polymer characterization

Thermal analysis: Tg=99° C. Tm=311° C.

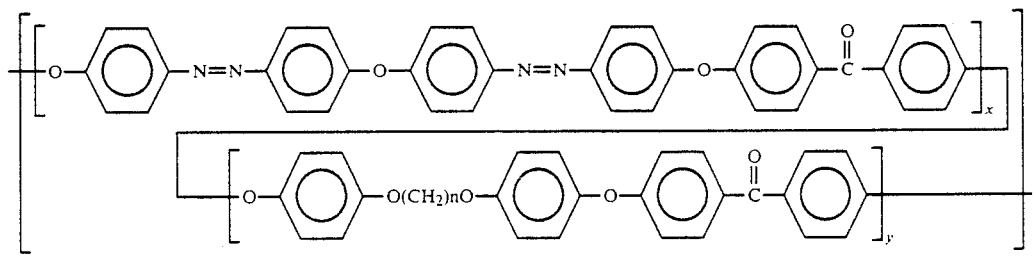

x = 50% mole; y = 50% mole; n = 6

Example 16

Example 15 was essentially repeated except that (4-hydroxy)-1,4-diphenoxybutane (2.7 g; 0.01 mol) was substituted for (4-hydroxy)1,6-diphenoxyhexane.

The final product was a powdery polymer.

Polymer characterization

Thermal analysis: Tm=313° C.

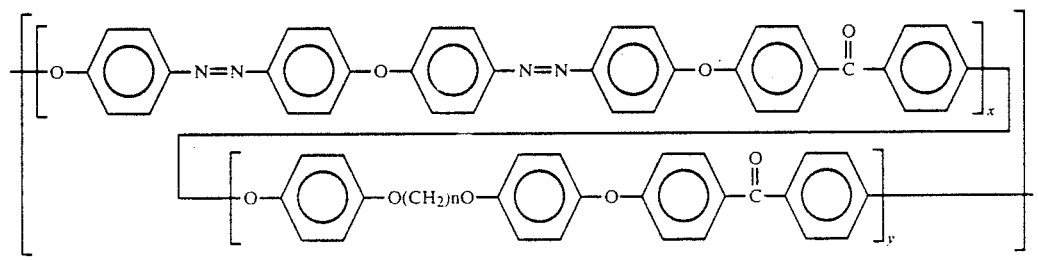

x = 50% mole; y = 50% mole; n = 4

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A substantially linear thermoplastic aromatic polyether composed of recurring units of the general formula:

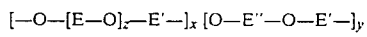

$$[-O-[E-O]_z-E'-]_x [O-E''-O-E'-]_y$$

where E' is the residuum of a benzenoid compound having an electron withdrawing group in at least one of the positions ortho and para to the valence bonds, and having a sigma* value sufficient to activate halogens in the said valence positions to a level adequate to react with an alkali metal phenolate, where E is the residuum of an azo-group containing bisphenol, where E'' is the residuum of a dihyric phenol which does not contain azo groups, wherein all said residua are valently bonded to ether oxygens through aromatic carbon atoms, wherein x and y each represent a mol % and x plus y totals 100 mol%, and x is greater than 0 and z=1,2 or 3.

2. The substantially linear thermoplastic aromatic polyether of claim 1 which is composed of recurring units having the formula:

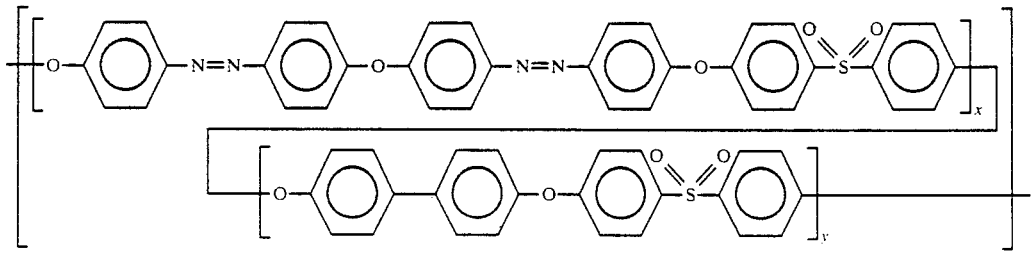

x = 10% mole; y = 90% mole

3. The substantially linear thermoplastic aromatic polyether of claim 1 which is composed of recurring units having the formula:

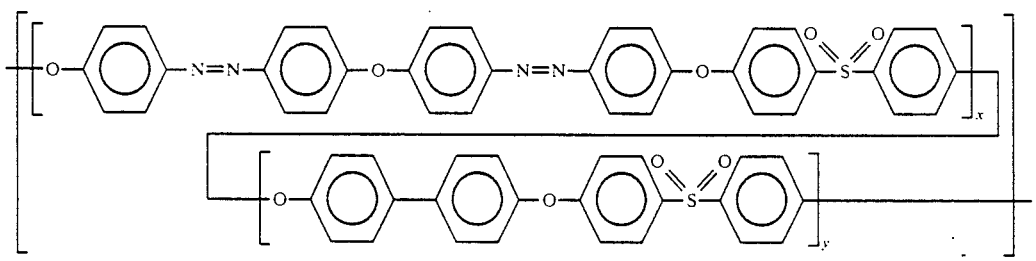

x = 20% mole; y = 80% mole

4. The substantially linear thermoplastic aromatic polyether of claim 1 which is composed of recurring units having the formula:

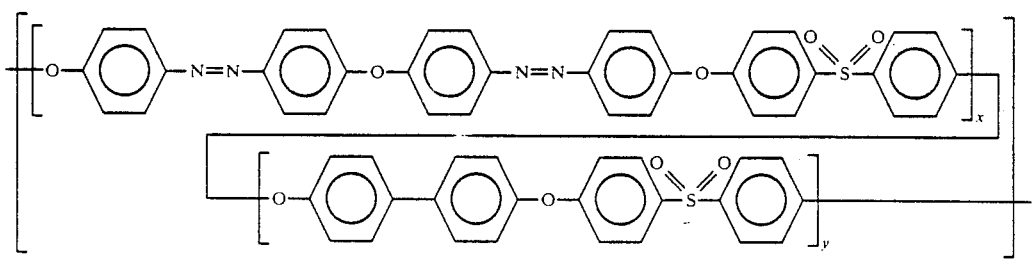

x = 50% mole; y = 50% mole

5. The substantially linear thermoplastic aromatic polyether of claim 1 composed of recurring units having the formula:

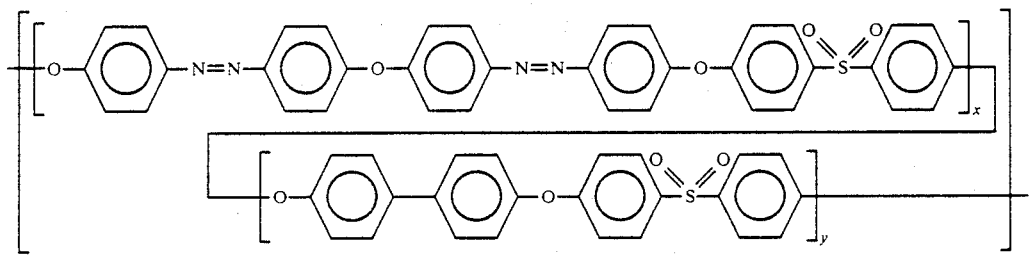

x = 75% mole; y = 25% mole

6. The substantially linear thermoplastic aromatic polyether of claim 1 which is composed or recurring units having the formula:

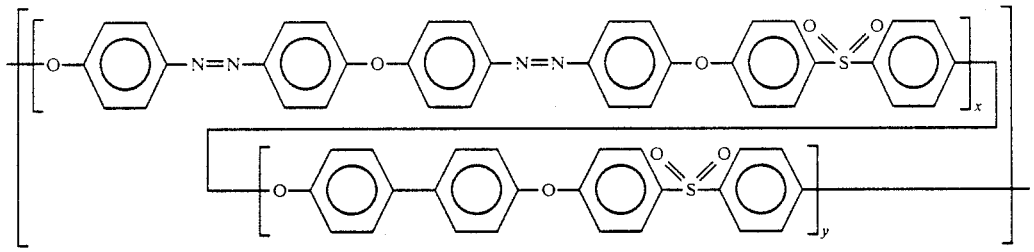

x = 100% mole; y = 0% mole

7. The substantially linear thermoplastic aromatic polyether of claim 1 which is composed of recurring units having the formula:

8. The substantially linear thermoplastic aromatic polyether of claim 1 which is composed of recurring units having the formula:

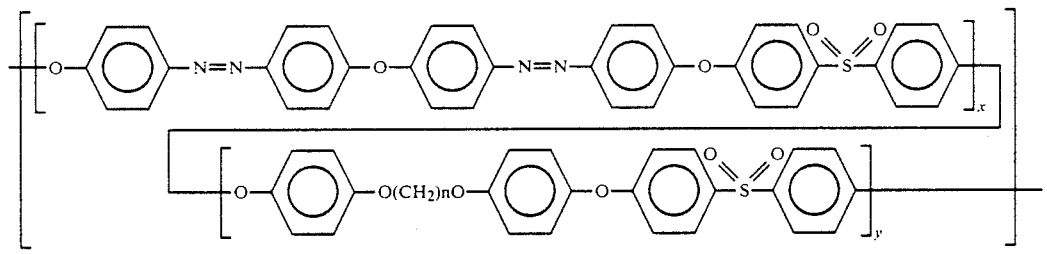

x = 50% mole; y = 50%, n = 6

9. The substantially linear thermoplastic aromatic polyether of claim 1 which is composed of recurring units having the formula:

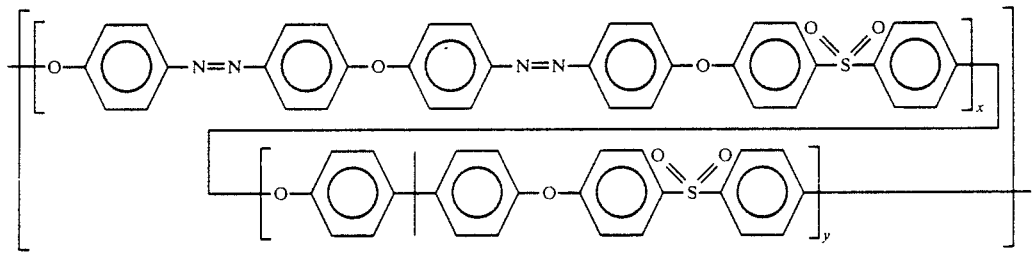

x = 20% mole; y = 80% mole

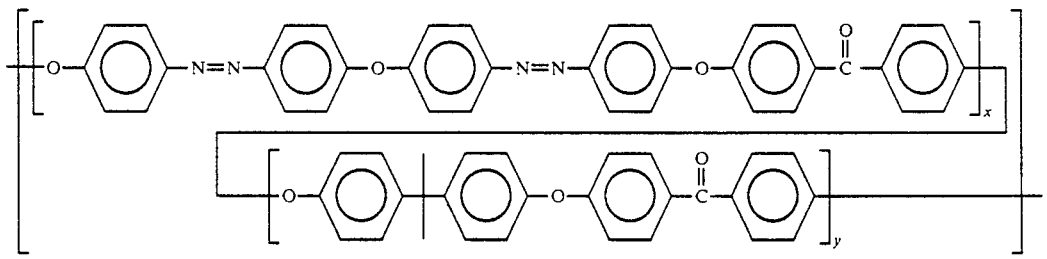

x = 1% mole; y = 99% mole

10. The substantially linear thermoplastic aromatic polyether of claim 1 which is composed of recurring units having the formula:

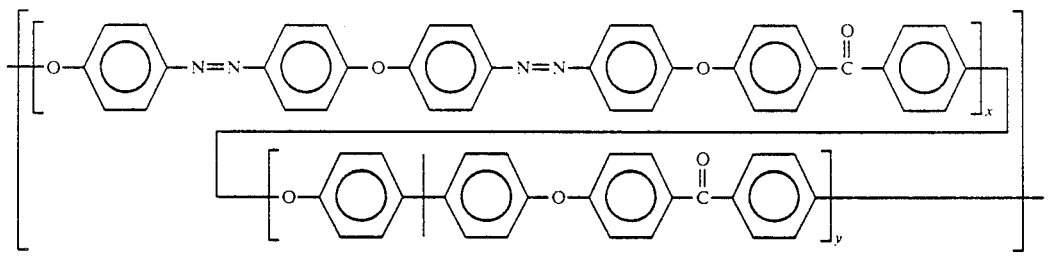

x = 10% mole; y = 90% mole

11. The substantially linear thermoplastic aromatic polyether of claim 1 which is composed of recurring units having the formula:

12. The substantially linear thermoplastic aromatic polyether of claim 1 which is composed of recurring units having the formula:

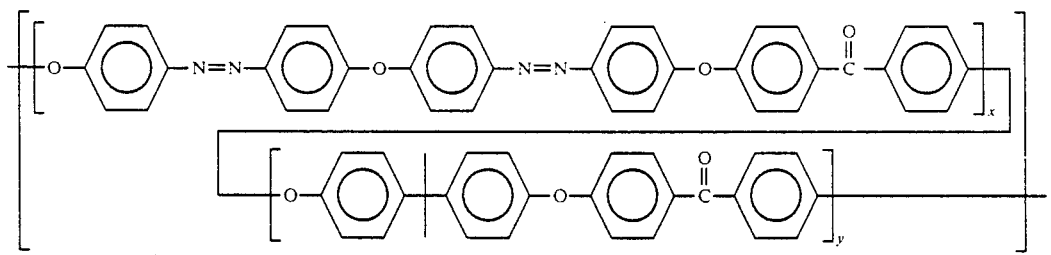

x = 50% mole; y = 50% mole

13. The substantially linear thermoplastic aromatic polyether of claim 1 which is composed of recurring units having the formula:

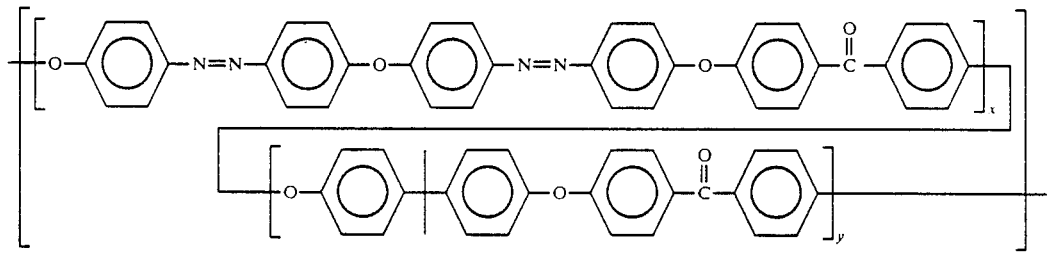

x = 20% mole; y = 80% mole

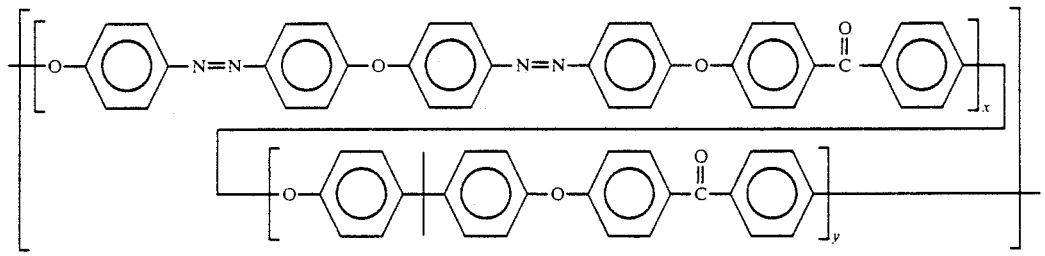

x = 75% mole; y = 25% mole

14. The substantially linear thermoplastic aromatic polyether of claim 1 which is composed of recurring units having the formula:

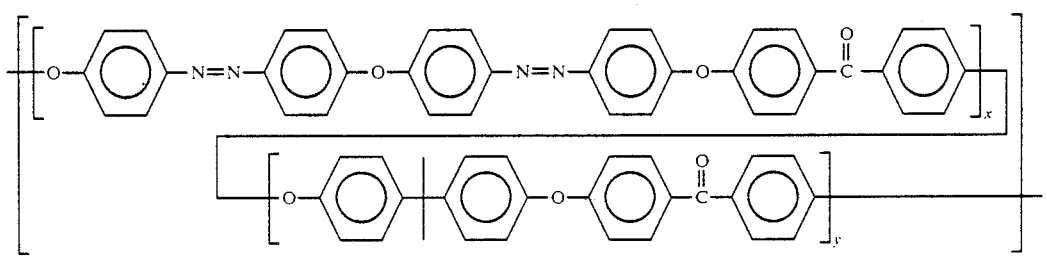

x = 100% mole; y = 0% mole

15. The substantially linear thermoplastic aromatic polyether of claim 1 which is composed of recurring units having the formula:

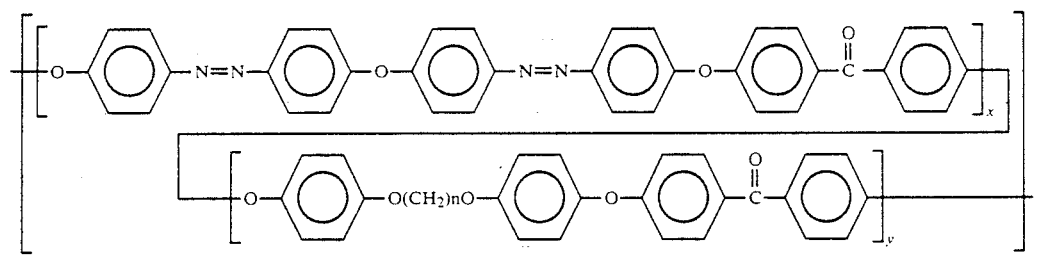

x = 50% mole; y = 50% mole; n = 6

16. The substantially linear thermoplastic aromatic polyether of claim 1 which is composed of recurring units having the formula:

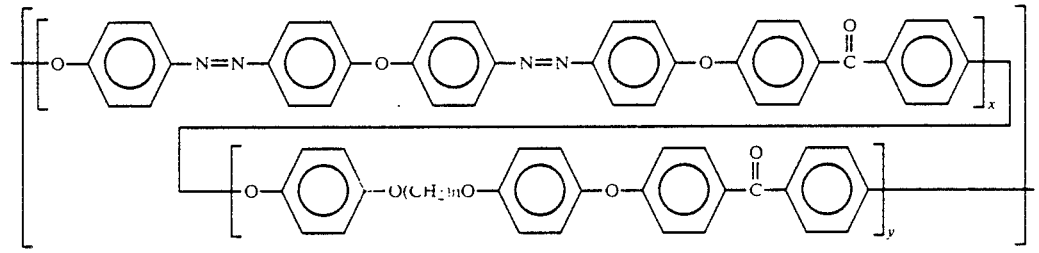

x = 50% mole; y = 50% mole; n = 4

* * * * *